(12) United States Patent
Hu et al.

(10) Patent No.: US 6,382,470 B1
(45) Date of Patent: May 7, 2002

(54) APPARATUS FOR DELIVERING POWDER IN A FOOD DISPENSER SYSTEM

(75) Inventors: Ruguo Hu, New Milford; Antonio Gutierrez, Kent, both of CT (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/539,119

(22) Filed: Mar. 30, 2000

(51) Int. Cl.⁷ .................................................. B65B 1/00
(52) U.S. Cl. ...................... 222/203; 222/196; 222/200; 222/226; 222/233; 222/235
(58) Field of Search ................. 222/196, 200, 222/202, 203, 226, 232–235

(56) References Cited

U.S. PATENT DOCUMENTS

| | | | |
|---|---|---|---|
| 3,353,720 A | * 11/1967 | Ricciardi | 222/200 |
| 3,508,687 A | 4/1970 | Burgstaller | 222/162 |
| 3,556,352 A | 1/1971 | Roberts | 222/203 |
| 3,955,718 A | 5/1976 | Von Holdt et al. | 222/197 |
| 4,105,143 A | 8/1978 | Blinn | 222/161 |
| 4,359,175 A | 11/1982 | Lizenby | 222/199 |
| 4,579,482 A | 4/1986 | Gastaldi et al. | 406/32 |
| 4,703,874 A | 11/1987 | Tapperman et al. | 222/198 |
| 4,709,723 A | * 12/1987 | Sidaway et al. | 137/584 |
| 4,878,523 A | 11/1989 | Balsamico et al. | 141/114 |
| 5,237,910 A | 8/1993 | Chigira | 99/282 |
| 5,271,439 A | * 12/1993 | Alack | 222/203 |
| 5,381,967 A | 1/1995 | King | 239/659 |
| 5,788,449 A | * 8/1998 | Riemersma | 222/203 |
| 5,944,470 A | * 8/1999 | Bonerb | 414/421 |
| 5,975,366 A | 11/1999 | Ridgley | 222/132 |

FOREIGN PATENT DOCUMENTS

AU    8545981    2/1986

* cited by examiner

Primary Examiner—J. Casimer Jacyna
(74) Attorney, Agent, or Firm—Winston & Strawn

(57) ABSTRACT

The invention relates to an apparatus for delivering powder in a beverage dispenser comprising a hopper for containing a mass of beverage powder. The hopper includes at least one flexible body member and an actuating mechanism coupled with the flexible body member. The actuating mechanism is operatively associated with a mechanical or magnetic driving device which is actuated in an active mode to actuate the actuating mechanism to impart motion to the flexible body member at a frequency that is sufficiently low to correspond to a non-vibrating mode.

26 Claims, 10 Drawing Sheets

APPARATUS FOR DELIVERING POWDER IN A FOOD DISPENSER SYSTEM

FIELD OF THE INVENTION

The present invention generally relates to food dispensers that include delivering powder systems. More specifically, the food dispensers are beverage dispensers which utilize soluble powders for the reconstitution of beverages such as in vending machines.

BACKGROUND OF THE INVENTION

Various automated beverage dispensers for making hot or cold beverage products are known in the art. In a conventional beverage dispenser, a metered amount of water-soluble beverage powder, stored in a powder storage chamber, and a complementary metered amount of hot or cold water supplied from a water source, are mixed to produce a beverage product, which is dispensed into a cup or glass. In more sophisticated beverage dispensers, a number of different types of beverage products are stored in a storage chamber to produce different types of hot or cold beverages, e.g., coffee, tea, hot chocolate, soup or exotic tropical drinks, at a user's choice. Because these beverage dispensers conveniently produce different types of beverage products with consistently high quality, these types of beverage dispensers are finding increasing acceptance with household, restaurants and the vending machinery industry.

In the above described beverage dispensers, the vending powders stored inside the chambers, generally known as the hoppers, are hygroscopic and have a tendency to easily absorb the moisture which may come both from the vapor of hot water during cupping and from the humid environment, especially when the dispensers are placed in countries of tropical climates. The moisture increases the powder inter-particle friction and sticky point which may cause the powder to form loose and/or hard clumps, cakes, cliff-building or bridges within the chamber that may consequently cause serious flow and dosing problems. One of the main problems in humid conditions comes from the macrostructures such as bridges crossing transversally the hopper and whose foundations sit along the walls of the hopper. Bridging causes serious flow problems as the powder does no longer reach the lower delivery part of the dispenser. Cliff-building is also known in hopper systems using an auger dosing mechanism to dose the powder before preparing the beverage. Indeed, the auger dosing mechanism has a tendency to empty the hopper in a non-homogeneous manner; i.e., the rear part before the front part of the hopper, thus causing the formation of cliffs along the sidewall of the hopper which is located closer to the outlet with respect to the opposite sidewall of the auger.

Vibrating or agitating devices are known to favor discharge of granular or powdered material from supply bags. For example, U.S. Pat. No. 5,381,967 relates to a hopper which is vibrated so as to dispense product. The vibrating systems are efficient to break up the large lumps in the powder mass.

U.S. Pat. No. 3,955,718 also relates to a container vibrator mechanism for use in a vending machine. The vibrating mechanism includes a pivotally mounted spring-biased arm actuatable to a locked position by the movement of a slide mechanism and releasable to apply a blow to the container's walls which is effective to vibrate the container and loosen the powdered content.

Although these devices might successfully reduce the problems of "bridging" of the powder, they also have serious drawbacks, especially, when they are used in dispenser machines in which agglomerated powder such as agglomerated instant coffee powder is treated. In particular, we found that the coffee agglomeration structure was damaged during the vibrating operation.

Indeed, the vibrating operation of the prior art imparts a continuous or discontinuous input of energy to the powder at a relatively high frequency (more generally around 5–50 Hz or higher) which causes crumbling of the agglomerated structure of the powder and, consequently, which causes an undesirable increase of the powder density. As a result on the powder density variation, the concentration of the beverage during reconstitution in water increases accordingly. Such a phenomenon is undesirable as it affects the quality and reproducibility of the beverage which is served by the dispenser machine.

In addition to this undesirable loosening effect of the powder structure, the vibrations applied on the hopper also cause the powder to progressively compact and form a denser powder mass inside the hopper. The powder compaction can be obtained with agglomerated powder but also with non-agglomerated powder such as creamer powder or soup powder. The powder compaction also affects the density of the powder and therefore causes accuracy problems in the dosage of the beverage.

Therefore, there is a need for a system that can efficiently reduce the flow problems of the powder in the dispensers and that can consequently ensure a precise and reliable dosing of the powder in such devices. In particular, there is a need to provide with a dispensing device which is effective in reducing the flow problems while preserving the benefits of the characteristics of the powder during the storage; i.e., preventing the powder from compacting and also more specifically agglomerated powder from loosening attrition.

SUMMARY OF THE INVENTION

The present invention relates to an apparatus for delivering powder in a beverage dispenser comprising a hopper for containing a mass of beverage powder, the hopper comprising at least one flexible body member wherein actuating means are coupled with the flexible body member of the hopper, and wherein the dispenser also comprises drive means which are coupled to the actuating means to actuate the actuating means and wherein the drive means are arranged with the actuating means so that the actuating means impart a motion to the flexible body member at a frequency that is sufficiently low to pertains to a non-vibrating mode when the drive means are activated in an active mode.

More specifically, the frequency, at which the actuating means of the invention may be considered as being actuated to impart such a motion within a range of non-vibrating modes, is less than 1 shock motion cycle per 2 seconds. Advantageously, the frequency should be even less than one cycle per 20 seconds and preferably, the frequency should preferably range from one motion cycle per 100 to 1000 seconds, and more preferably one motion cycle per 300 to 600 seconds. Within that range of very low frequency mode, the hopper is still moved frequently enough to prevent the powder from sitting along the side of the hopper and from forming bridges and rat holes but it is also moved sufficiently gently and slowly to preserve the intrinsic structure of the powder without risking the compaction of the powder mass and, consequently, a precise and constant powder delivery flow can be ensured. As also resulting from the flexibility of the hopper member, no resonance modes are created upon actuating on the hopper and the shocks are sufficiently dampened by the structure of the hopper to prevent the powder from loosening attrition and/or from compacting.

As a result of both the low frequency driven motion and the absence of resonance mode of the hopper, the density of the powder can remain constant within the hopper ensuring a reproducible dosing and preventing variation of concentration over time.

A shock motion cycle is defined as the period during which the hopper is moved in a non-repeated and individually identifiable path which may encompass, for instance, a full reciprocating motion in at least one determined direction. A shock motion may be, for instance, a motion in which active pushing and/or pulling forces are imparted with a return to an origin by passive means such as spring biased means and/or active means such as actuating means. It may also be a combination of active pulling and pushing forces in one direction to form a reciprocating movement. Finally, it may also be a combination of pushing and/or pulling forces applied in different directions onto the hopper member which makes the hopper member deform partially or totally in a more complex resulting movement.

The profile of the shock motion cycles may have the form of a series of discontinuous shocks separated by rest periods. In other words, the pushing and/or pulling means are actuated in discontinuous manner to provoke discontinuous shocks which act onto the flexible hopper member at the recommended effective frequency to prevent formation of rigid powder structures. A shock is preferably obtained by actuating the hopper at a relatively high velocity over a relatively very short distance so as to break the macrostructures of powder while keeping intact the powder agglomerate structure.

In another possible embodiment, the shock motion cycles form a continuous profile of a series of individual adjacent shock cycles.

In a preferred mode, the actuating means are mechanically driven. However, in an alternative embodiment, the actuating means could also be magnetically driven.

In one embodiment, the mechanical actuating means may comprise a movable ring-shaped member which surrounds at least partially the flexible body member and a pushing mechanism which imparts to the ring-shaped member a reciprocating motion in a direction substantially transverse to the flexible hopper. It has been surprising to found that a reciprocating motion applied transversely participates efficiently in the destruction of the powder bridges and/or cliffs within the hopper. The side of the hopper are the walls which are particularly exposed for being the support for the foundation of these powder macro-structures. Therefore, the reciprocating motion in the transverse direction breaks up the powder foundations at an early stage before they cause flowing problems in the subjacent delivery system. Due to the transverse direction of the forces applied onto the hopper, the powder has less tendency to compact as there is no gravity forces applied on the powder mass. The combination of repeated shocks on the flexible structure at low frequency and the transverse orientation of these shocks onto the hopper favors the integrity of the powder microstructure and does not affect the initial density of the powder. The structure with the ring-shaped member is also particularly simple and reliable and can endure a repetition of shock motion cycles during an extensive period of time.

A controlled repetition of the motion can also be ensured by a pushing mechanism which may advantageously be actuated by a cam means which comprises a contact surface with at least one raised area adapted to repetitively push the hopper through the ring-shaped member in the transverse direction.

In a preferred embodiment, an elastic tension means is further connected to the ring-shaped member in a position effective to substantially maintain the rigid member in contact with the cam means and pull the ring-shaped member back in its position of origin for another motion cycle.

In a preferred embodiment, each raised area comprises a first ramp portion increasing progressively followed by a second steeper decreasing portion which transmits a shock to the hopper.

In a variant of the invention, the actuating means may comprise a crankshaft mechanism arranged in rotation above the hopper to move slowly up and down the flexible hopper member. More particularly the crankshaft mechanism includes a rotary crankshaft member transversely arranged above the hopper and which includes at least one crank connection means substantially offset with respect to the rotation axis of the crankshaft member so as to impart a reciprocate and substantially vertically oriented motion to the upper part of the hopper upon rotation of the crankshaft member.

In a preferred embodiment, the drive means comprise a rotary motor coupled to the dosing mechanism of the apparatus and transmission means adapted to connect the dosing mechanism to the actuating means.

The combination of various actuating means may be preferred in some circumstances where the relative humidity is high and/or the powder more sensitive to the bridging phenomenon. For instance, a combination of a transverse pushing mechanism and a pulling crankshaft mechanism from above as proposed can be envisioned as an effective system to solve any possible critical situations.

In addition to the actuation of a flexible part of the hopper, the powder is further protected from environmental humidity through a tight arrangement of the hopper with combinations of at least one flexible portion which is submitted to actions from the actuating means and at least one rigid portion to allow a convenient and relatively tight fitting of the flexible portions of the hopper onto the delivery base located underneath of the dispenser.

The invention also comprises an apparatus for delivering powder in a beverage dispenser comprising a hopper for containing a mass of beverage powder with the hopper comprises at least one flexible body member. The apparratus also includes means for dosing the powder and means for driving the dosing means in rotation according to a predetermined revolution rate. A mechanical actuating means is coupled with the flexible body member of the hopper to impart an actuating motion cycle to the flexible body member according to at least one pushing and/or pulling direction (s) when the actuating means are driven in rotation according to a second revolution rate. Also, gear means engaging both the actuating means and the dosing means are provided, with the coupling means arranged to transmit a gear reduction from the first revolution rate of the dosing means to the second revolution rate of the actuating means so that the actuating means impart a motion to the flexible body member at frequency under a non-vibrating mode.

The apparatus of the invention may conveniently dispense various beverage powders such as instant coffee, chocolate or cocoa-based, milk, fruit-based or vegetable-based soluble powders, etc., in particularly warm and wet environments sicj as tropical climates. Bulk densities of the powders which may be processed may be between 200 grams/liter to 800 grams/liter. For instant coffee powder, the bulk density may be approximately 200 to 300 grams/liter, more preferably 220–260 grams/liter whereas for soluble drink mix such as chocolate mix, the bulk density may vary up to 800 grams/liter.

BRIEF DESCRIPTION OF THE DRAWINGS

Preferred features of the present invention are disclosed in the accompanying drawings, wherein similar characters denote similar elements throughout the several views, and wherein.

DETAILED DESCRIPTION OF THE PREFERRED EMBODIMENTS

Figure 1:
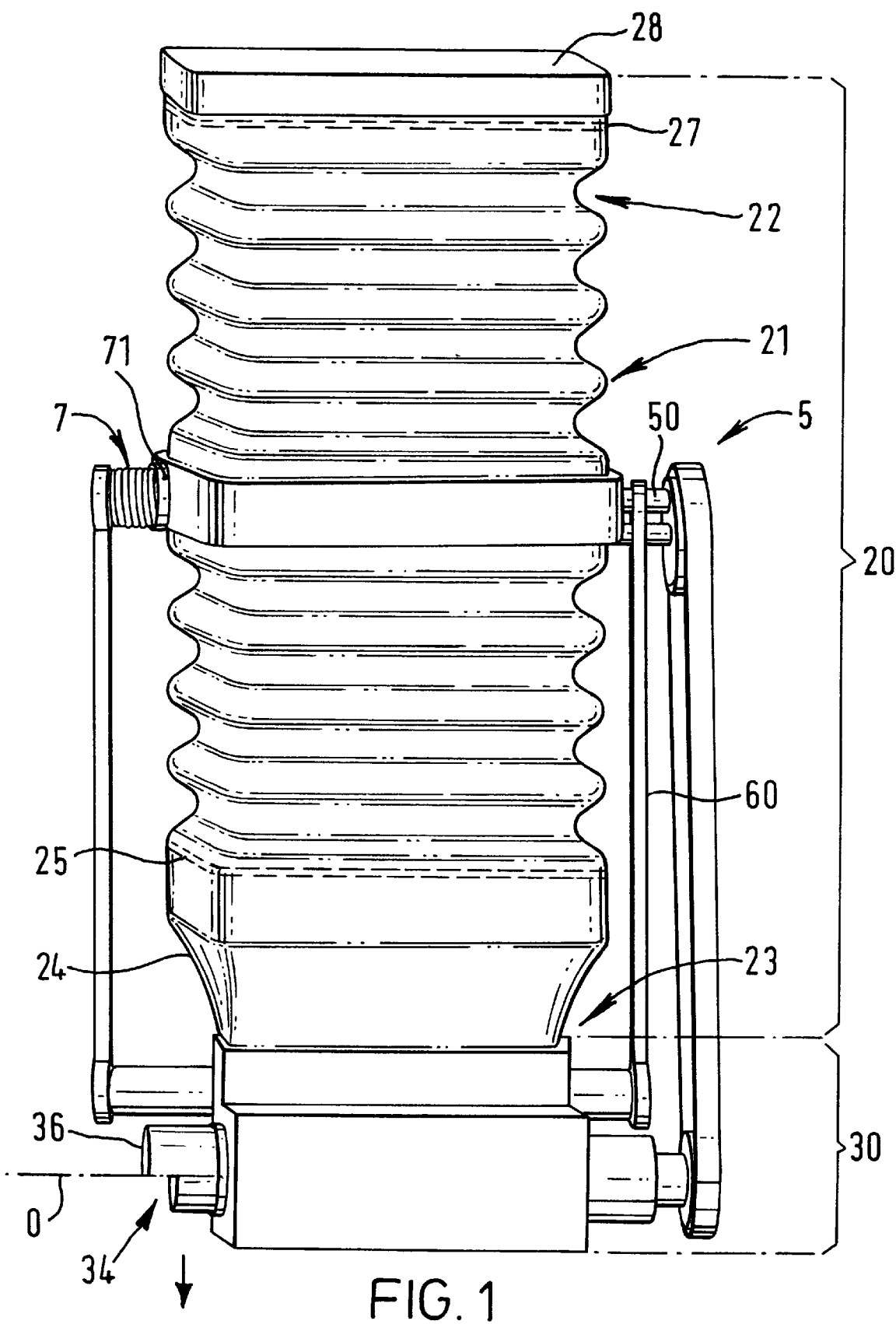
FIG. 1 is a front view of the apparatus for delivering powder of the invention.
Figure 2:
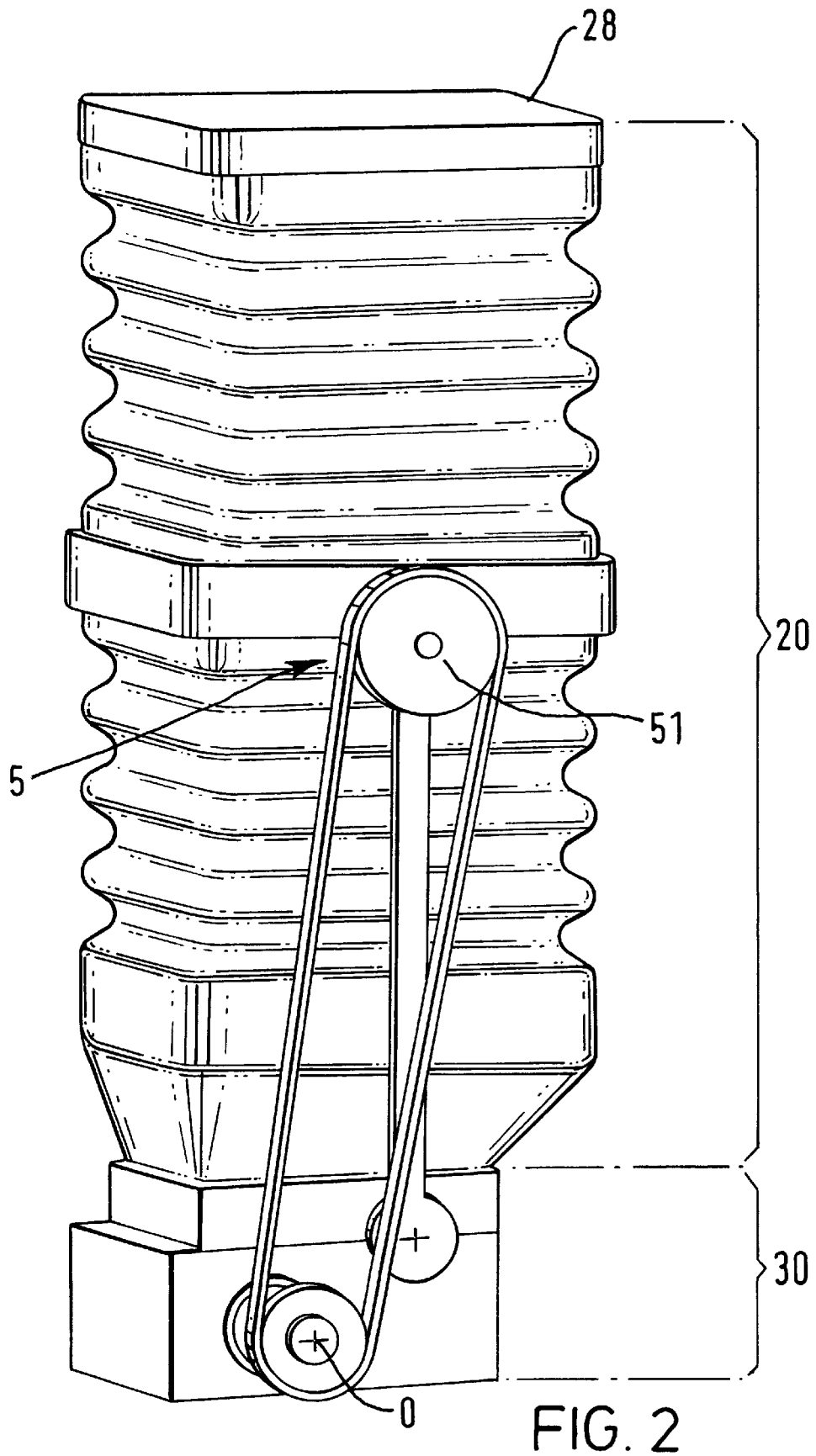
FIG. 2 is a side view of the apparatus of FIG. 1.

Referring to FIGS. 1 to 4, there is illustrated an apparatus 1 applicable for a beverage powder dispenser system in a first embodiment of the invention.

The apparatus of the invention includes a hopper, with the reference number 20, which is arranged to supply a delivery and dosing system 30 with downwardly flowing powder 3. The hopper has a main body 21 which vertically extends from a top end 22 to a bottom end 23. The main body is arranged to be substantially flexible from its top end to its bottom end. The flexibility can be obtained by the choice of relatively flexible materials and/or by suitable extensible structures. Preferably, a flexible but resistant plastic material with an accordion or pleated design is preferred as conferring both sufficient strength for properly supporting the load of granular material and the required flexibility for preventing the structure from vibrating under possible resonance modes. Suitable plastic materials are food acceptable materials such as polyethylene, polypropylene or nylon for example. The wall thickness depends upon the relative size and capacity of the hopper. An average suitable thickness is comprised between 200 micron to 10 mm, preferably 1 to 5 mm.

The lower end of the main body is connected to a rigid lower base 24 of the hopper by sealing means 25, preferably a joint rubber ring or other suitable mechanical clamping means. For that, the lower end 23 overlaps a portion of the rigid lower base 24 and the ring 25 applies a pressure over the lower end against the base effective to provide a relatively tight connection and significantly prevent moisture ingress.

In its upper end, the main body 21 also connects to an upper rigid portion 26 by a similar tight sealing means 27 similar to sealing means 25. A removable cover 28 is provided to tightly engage the hopper body on the top of the rigid portion 26. As a matter of construction, both rigid portions 24, 26 are attached to a rigid reference of the dispenser (not shown) so as to allow to maintain the flexible hopper body in relative extension to prevent collapsing between the two portions 24, 26.

Although the height of the rigid parts 24, 26 of the hopper needs to be sufficiently high for the connection, it should be kept minimum to reduce the risk of powder bridging or cliffs from building in these areas. It is important to note that this tight hopper arrangement intends to render the hopper as closed as possible to the outside environment so that the powder is protected from the environmental humidity.

Figure 3:
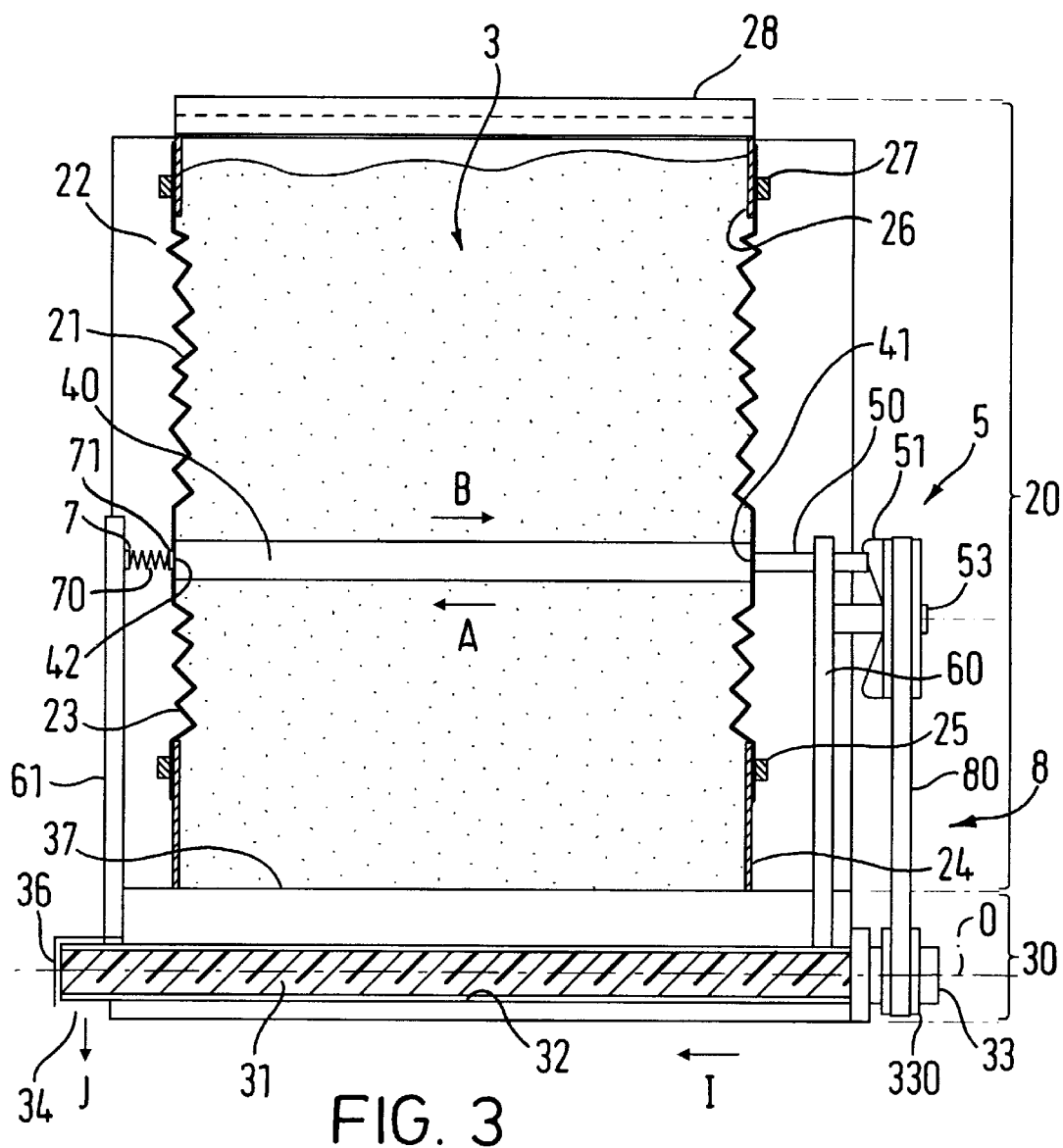
FIG. 3 is cross-sectional view of the apparatus of FIG. 1.

On the lower part of the apparatus is installed the dosing device 30 which generally may be an auger drive mechanism well known in the art. The dosing device is arranged under the lower outlet 37 of the hopper to be continuously and gravity fed with powder. The powder is discharged in a lengthwise oriented auger 31 disposed within a complementary shaped housing 32 extending along longitudinal axis O of the dosing mechanism. The auger is driven in rotation by a rotary electrical motor at the rear of the device (not shown) via a drive adapter 33 as illustrated in FIG. 3. The dosing device described hereinabove may be put into operation e.g. by pressing a control switch of a beverage dispensing machine, which the apparatus is making a part of. An impulse on the switch results in energization of the drive motor which causes the auger to rotate according to a cycle function of a predetermined dosing diagram. The powder contained in the auger is so capable to move in direction I and, part of it exits the dosing device through outlet 34 of the delivery device. An outer cover part 36 can be installed at the outlet for directing the powder in a suitable direction J. e.g., downwardly in a mixing chamber or in the container itself (not shown). In this manner a precise dosing can be obtained according to a predetermined number of revolutions of the auger. As aforementioned, the lower portion 24 of the hopper is directly connected to the housing of the dosing device along a longitudinally oriented passage 37 and the powder feeds in a continuous manner the housing through the passage 37.

According to an important aspect of the invention, actuating means are provided to impart an actuating motion to the flexible main body 21 of the hopper in order to maintain the fluidity of the flow toward the dosing device and to prevent bridges, rat holes and/or cliffs from forming within the hopper. For that, a moving band or ring 40, preferably inextensible and substantially rigid, is mounted around the hopper body. A closed ring is currently preferred for reasons of simplicity but is not critical. Substantially similar members with a discontinuous arrangement may also be envisioned such as a C-shaped ring or the like. The moving ring may be shaped to surround in a substantially tight arrangement the flexible hopper body, preferably in or close to the median region of the hopper. The ring may also be fixed to the hopper or may be an integral part of the body. The ring is preferably several centimeters high, i.e., about 1–3 cm high.

Figure 4:
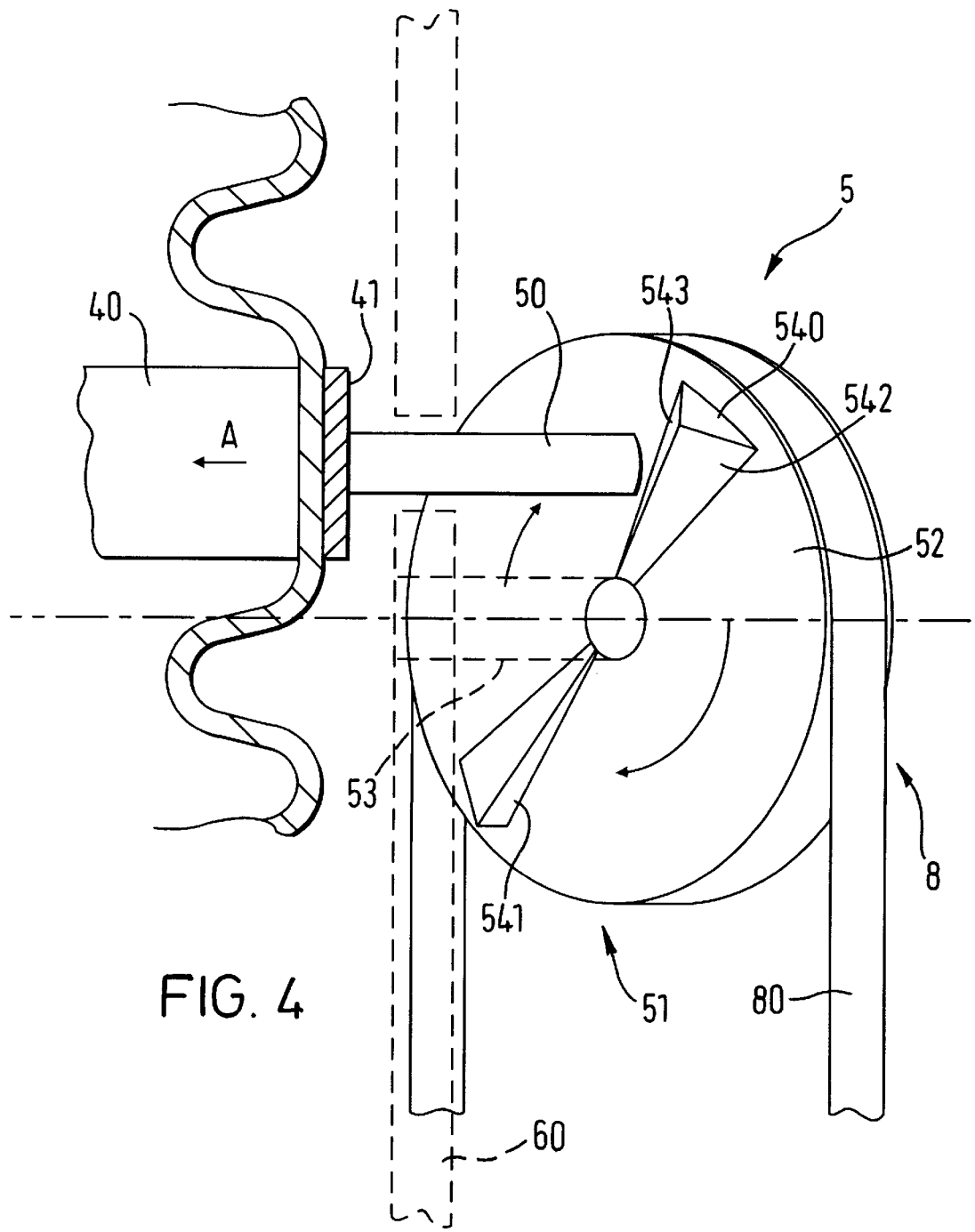
FIG. 4 is a view of a detail of the apparatus of FIG. 1.

The ring is put in motion by a repetitive pushing mechanism 5 illustrated in detail by FIG. 4. For that, a rigid member or finger 50 is fixedly attached to the rear end 41 of the ring and protrudes outwardly toward a disc-shaped cam means 51 of the pushing mechanism. The member 50 is slidably mounted through a vertically oriented side arm 60 which forms an upward extension of the frame of the apparatus. For instance, the side arm 60 can be directly connected to the base of the dosing device 30. The disc-shaped cam means 51 is also rotatably mounted through the side arm 60 by a transversal axle 53 in a position slightly vertically offset with respect to the position of the protruding rod 50.

As shown in FIG. 4, onto the substantially circular surface of contact 52 of the cam means facing the protruding member or finger 50 is provided a pair of opposite raised areas or bumpers 540, 541 which protrude inwardly from the circular surface. These raised areas can be, as proposed, two opposed ribs onto which the protruding rod 50 is caused to engage repetitively during the rotation of the cam means to push back the ring 40 in horizontal direction A; i.e., in direction away from the pushing mechanism.

In order to create a reaction in the other direction, i.e., in direction B, and permit the protruding member 50 to stay in contact with the surface 52 of the cam means and thus, the system to come back to the origin for another shock motion cycle, an elastic tension means 7 is provided at the opposite end or front end 42 of the ring. A relatively constant compressive pressure is maintained on the ring by means of a compression spring 70 which is mounted around an axle (not shown) guided-through a second side arm 61 of the frame. A large section-washer 71 can be inserted between the spring and the ring to more efficiently distribute the compression pressure of the spring. In use, the elastic tension means 7 will compress more when the rod 50 contacts a rib and will release some of its tension when the rod is in contact with the flat region of the circular surface outside the contour of the rib. In this embodiment, it is evident that the motion of the ring 40 substantially maintains the transverse cross-sectional shape of the main body 21.

Figure 7:
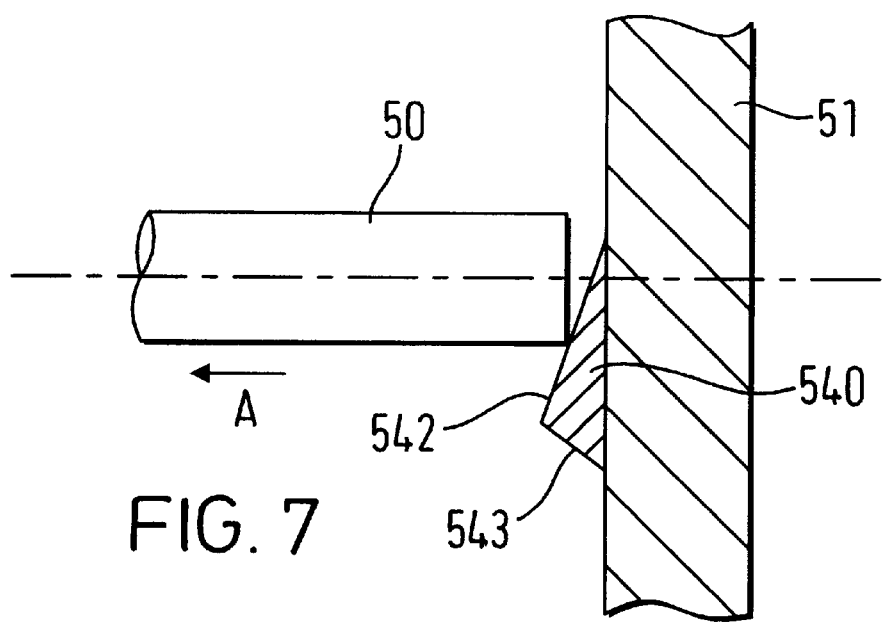
FIGS. 7 and 8 are views of a detail of the actuating means in the embodiment of FIGS. 1 to 4.
Figure 8:
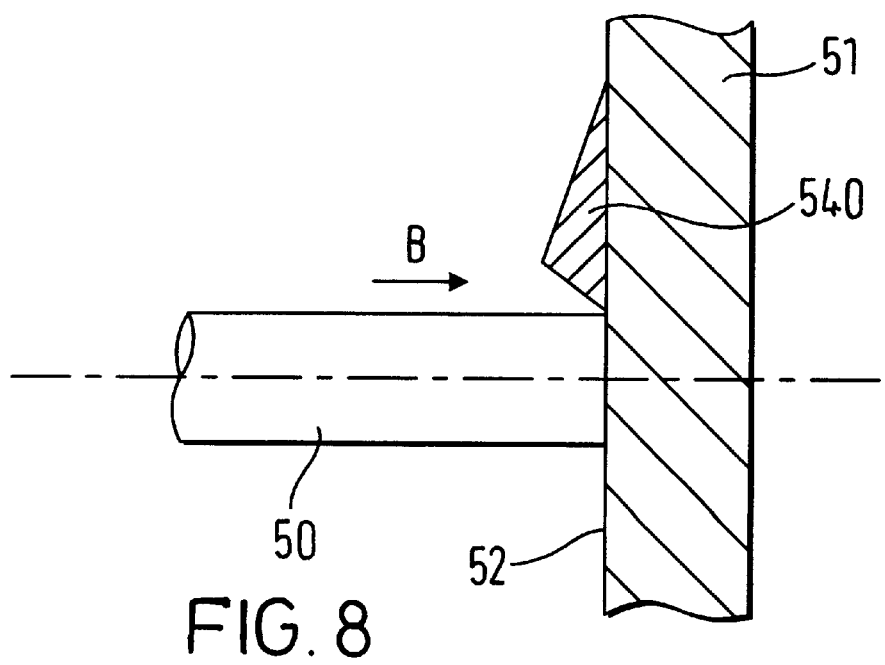
Figure 9:
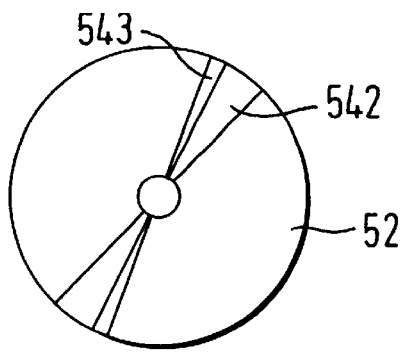
FIG. 9 is an elevation view of the cam means of FIGS. 7 and 8.
Figure 10:
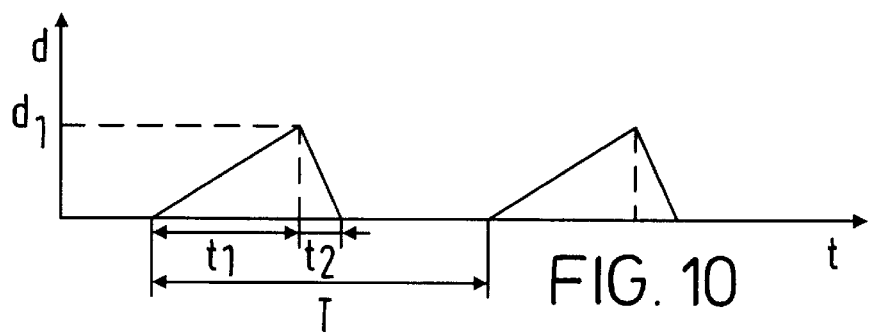
FIG. 10 illustrates a graph of the distribution of the motion cycles according to the cam means of FIG. 9.
Figure 11:
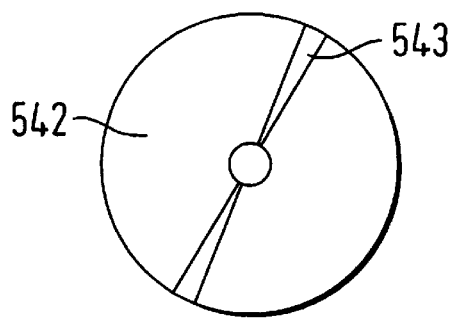
FIG. 11 is an elevation view of a variant of FIG. 9.
Figure 12:
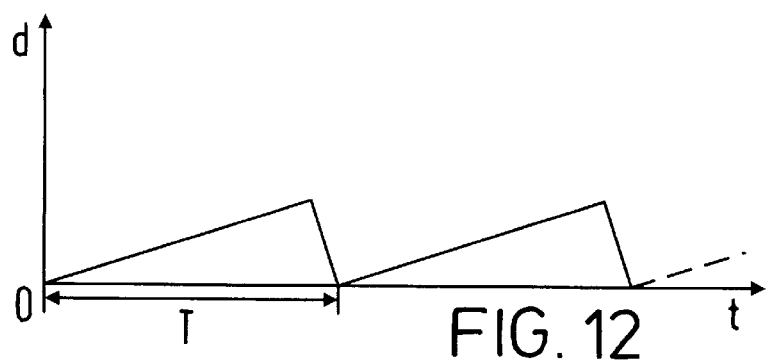
FIG. 12 illustrates a graph of the distribution of the motion cycles according to the cam means of FIG. 10.

FIGS. 7, 8 and 9 illustrate the reciprocating motion of the protruding rod 50 when it passes along one raised area, 540 during rotation of the disc-shaped cam in the pushing direction A, where the rod is engaged along a progressive ramp portion 542 of the rib, and in the return direction B, where the rod is engaged along a steeper negatively-oriented portion 543 of the rod until it reaches the base of the circular surface. The engagement of the rod along the steeper portion 543 causes a short "acceleration" of the motion of the hopper similar to a shock which is sufficient to break up the bridging formations along the side walls of the hopper body. FIG. 10 shows a graph of the displacement of the rod as a function of time. The period T is identified as the period during which the hopper is moved in a non-repeated and individually identifiable path before the hopper is engaged in another identical path. It must be noted that during its travel along the flat surface 52, the hopper is submitted to no motion at all. As the rod engages the ramp portion 542, the hopper is submitted to a positive displacement of $+d_1$ for a time $t_1$. Then, as the rod engages the steep portion 543, the hopper is submitted to a negative displacement of $-d_1$ for a time $t_2$ lower than $t_1$ and therefore the hopper undergoes a portion of higher velocity $d_1/t_2$ comparable to a shock which is sufficient to break up the bridging formations. FIGS. 11 and 12 illustrate an alternative embodiment in which the profile of the motion cycles is made of series of adjacent shock cycles with progressive ramp areas 542 followed by steep decreasing portions 543 so that a period T represents a full passage of the rod along the first areas 542 and second areas 543.

As the wheel-shaped cam means is provided with "n" raised portions along its circular surface, for instance n=2 in the present illustrated case, a single shock will occur repetitively every $(360/n)°$ angle rotation; i.e., every 180° angle rotation in the present case as the rod engages the steep decreasing portion 543. For a same given cam diameter, the frequency of each shock cycle will increase accordingly to the number "n" of raised areas provided on the cam. Of course, the reduction of the cam diameter will cause the cam to rotate at a higher velocity and also will affect the shock frequency at a higher rate accordingly. In any event, the velocity, as well as "n", will be chosen so as to set up the desired frequency value, and preferably a shock frequency comprised between 1/100 to 1/1000 Herz, preferably between 1/400 to 1/600 Herz.

Of course, the number of raised areas or ribs as well as their sloping profiles can vary depending upon various factors such as the type of powder, the capacity and size of the hopper, the powder distribution size or also the humidity level, etc.

In a preferred aspect of the invention, the actuating means is arranged in a manner so as to be driven in accordance with the rotative motion of the dosing device 30; i.e., the auger drive mechanism. In other words, the dosing means 30 will transmit to the actuating means the energy during the dosage operation; e.g., upon the operative action of the switch by the consumer. Indeed, there is no need to run the actuating means constantly over time as it would increase the risks of compaction of the powder. However, it is necessary to ensure a good flowability of the powder to prevent dosage problems at the time the dispensing device is in service. For that, the actuating means are coupled to the auger drive mechanism by flexible transmission means 8. The transmission means are preferably gear means which comprise a vertical transmission belt 80 connecting the cam means; i.e., pushing wheel 51 to the drive adapter 33 of the auger drive mechanism. For that, the drive adapter is shaped to form a wheel 330 with a peripheral bearing surface which the belt can gear on. Therefore, when the wheel of the auger 31 is driven in rotation by the motor shaft during a certain time period corresponding to the dosing cycle for one beverage serving, the auger drive adapter 33 transmits a couple via the belt 80 to the pushing wheel 51. Generally, the velocity of the auger is comprised between 20 to 40 revolutions/min when the dosing system is switched in active mode; i.e., during the delivery operation for serving a beverage. The gear means are sized to provide a proper gear reduction which is necessary to reach the low action frequency onto the hopper.

Therefore, the pushing wheel, the belt and the drive adapter must be dimensioned in accordance with the low frequency desired. For instance, it has been experimentally determined that, in average, one actuating motion was desired every 20 to 30 coffee cup dispensings. Of course, the calculation of the frequency based on cup servings may vary considerably depending upon different factors such as the nature of the beverage powder (coffee, chocolate, soup, etc.), the desired concentration, cup capacity, the type of dosing system, etc. As an example, one regular coffee cup will be dosed, in average, by 2–3 revolutions of the auger. By the time 30 cups of coffee will be produced, the auger will have rotated a maximum of 90 revolutions which would have caused the rotation of ½ revolution of the pushing wheel as corresponding to one shock cycle. Therefore, the maximum demultiplication rate or gear reduction of the transmission mechanism will have to be at a maximum of 180. In the case, 20 cups only are produced for 2 auger-revolutions per cup, the demultiplication rate should be 80. Therefore, a demultiplication rate of around 80 to 180 of the transmission system may be recommended to match the desired shock frequency.

Figure 13:
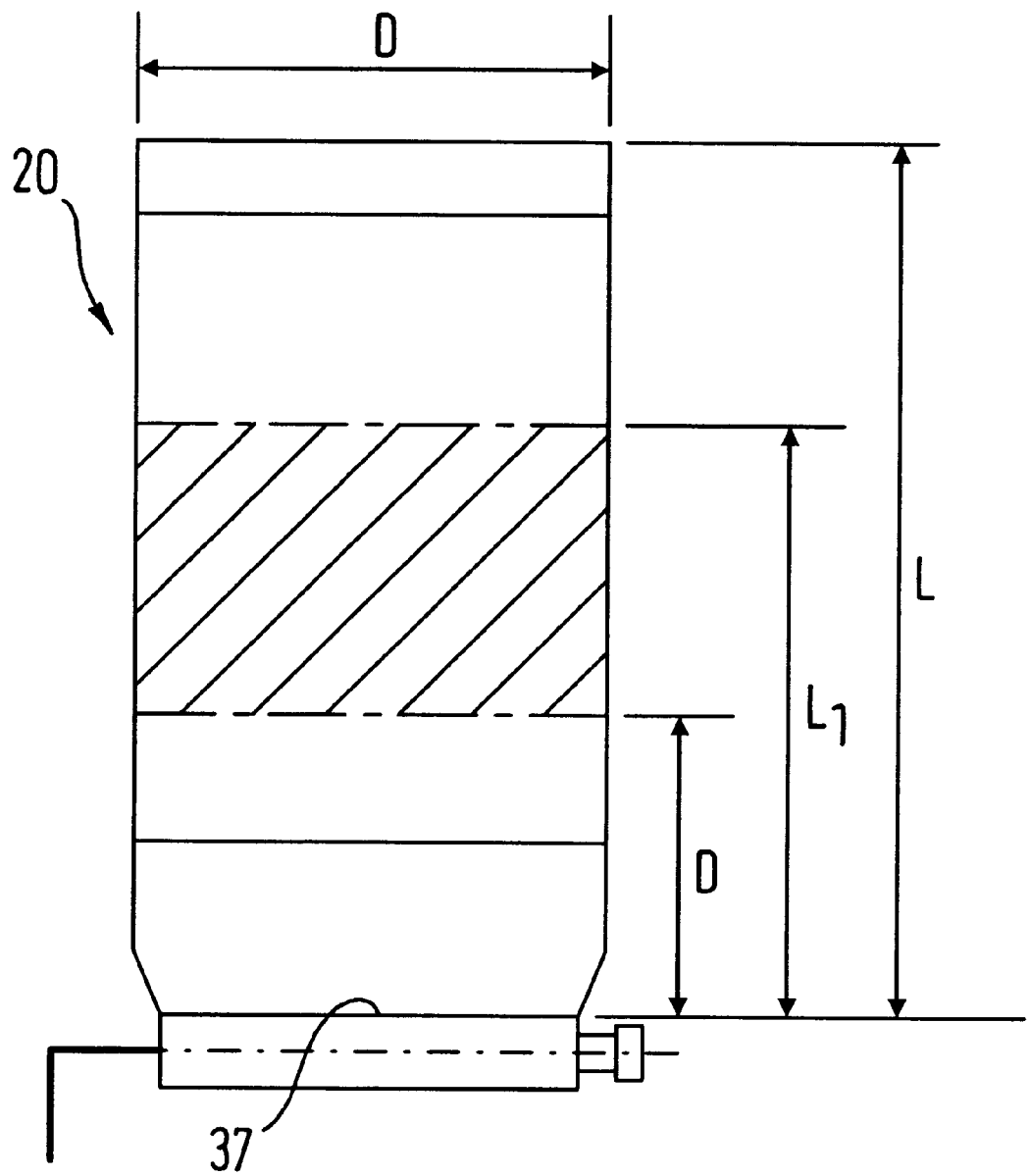
FIG. 13 is a schematic view of the apparatus of FIG. 1 in which is identified the critical bridging zone.

It has been experimentally discovered that the bridging has a tendency to form in a middle region of the hopper as illustrated in FIG. 13. More precisely, it has been found advantageous to apply the transverse forces for moving the hopper; i.e., corresponding to the location of the ring-shaped member, at a minimum distance from the lower base or outlet 37 of the hopper which is substantially equal to half the transversal dimension D of the hopper section, and more preferably equal to the transversal dimension D of the hopper section. Distance D is here to be considered as the diameter for a circular hopper or the longer dimension for a standard rectangular section. Similarly, the maximum distance from the lower base to have the forces applied onto the hopper has been experimentally determined to be substantially equivalent to a length $L_1$ equal to ⅘ of the overall hopper length L. In consequence, the regions outside these lower and upper limits may be left free of any transverse actuating means and may even be taken to form the rigid portions of the hopper.

Figure 5:
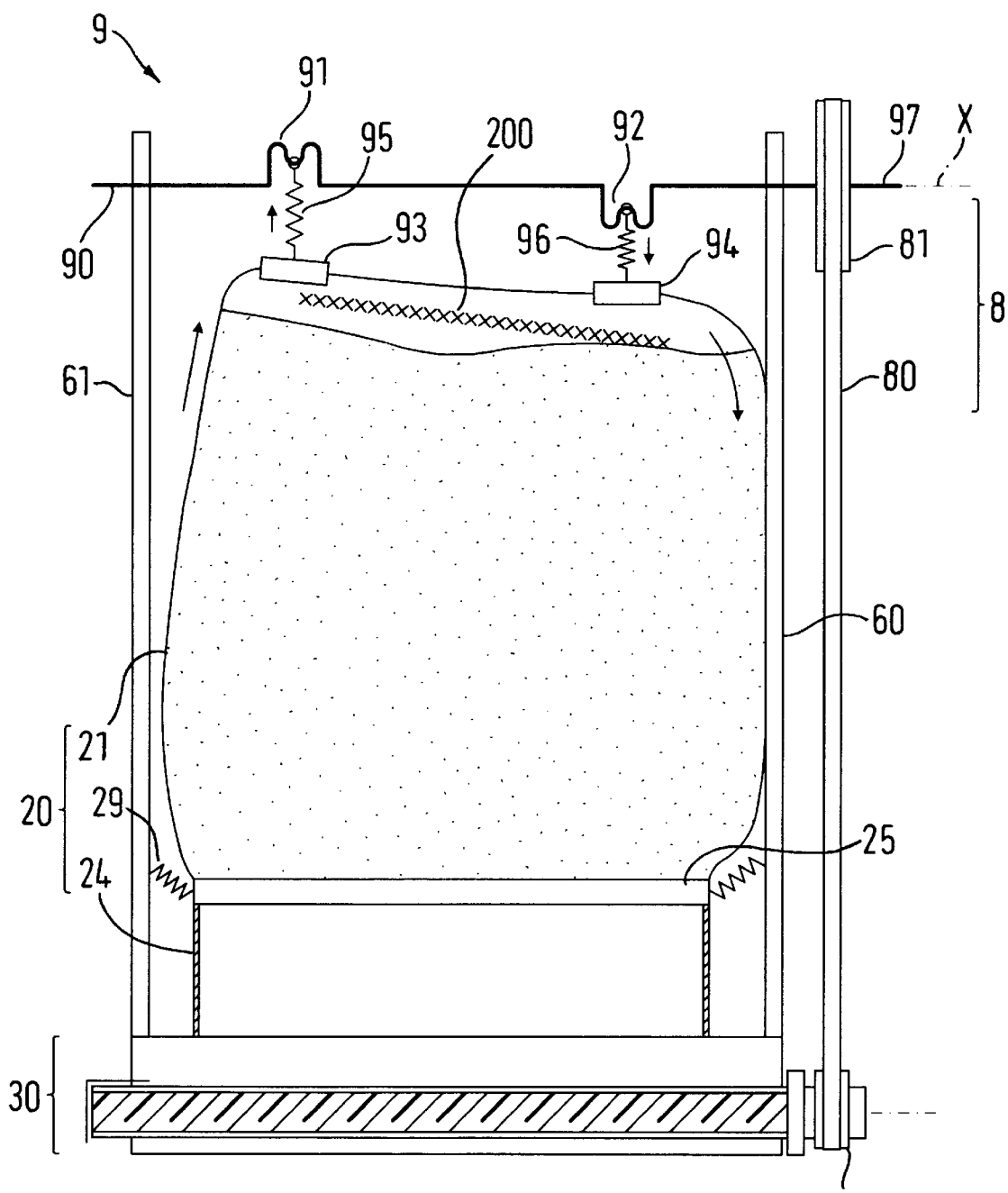
FIG. 5 is a cross-sectional view of a variant of the invention.

FIG. 5 illustrates an alternative embodiment. The apparatus includes a hopper 20 formed of a first supple upper body member 21 and a lower base portion 24. The lower base portion may be either sufficiently rigid to support the powder load of the hopper, or may be flexible; i.e., not sufficiently supportive to bear alone the powder load. Sealing means in the form of a clamping ring 25 are provided which may have to be supported by holding means such as a series of elastic tension hangers 29 when the lower base is not sufficiently rigid.

The flexible portion 21 of the hopper may be a simple pouch made of a resistant and flexible material such as polyethylene, polypropylene, nylon or any suitable monolayered or multi-layered plastic. It may or may not have an accordion structure.

The embodiment of FIG. 5 mainly differs from the previous one by the actuating means provided at the upper part of the apparatus above the hopper which provide a repetitive pulling and loosing in turn of the hopper's sidewalls. The actuating means has the form of a crankshaft mechanism 9 which includes a crankshaft member 90 transversely arranged above the hopper and which includes radially oriented crank connections means 91, 92 which serve for hanging of the flexible hopper member 91. The crankshaft member is mounted in rotation along an axis X passing through a pair of guiding vertical extensions 60, 61 of the housing of the apparatus. The upper wall of the hopper hangs via a pair of pinching members 93, 94 or clappers and connected to the radially oriented crank connections 91, 92 by elastic tension elements such as tension helicoidal springs. The tension springs could also be replaced, as well, by rubber bands or other similar elastic equivalents. The crank connections 91, 92 form transversely spaced apart portions along the rod to properly hang the hopper member at two spaced apart locations; one close to the front vertical wall of the hopper, and the other close to the rear vertical wall of the hopper. They also form offset portions of the crankshaft rod 90 with respect to the axis X so that when the rod is actuated slowly in rotation at the required low frequency values, a reciprocate vertically oriented resulting motion is imparted at each location of the hopper upper surface which so tends to pull the front and rear walls of the hopper up and leave them down respectively, thus breaking up any powdered macro-structure which would have formed within the hopper by taking support along the side walls of the hopper. As shown, the connections 91, 92 may extend in opposite positions from each other to impart a titling movement to the hopper. These repeated actions also ensure the powder slides off the wall of flexible hopper member and falls down in a steady flow to the powder delivery mechanism 30 located underneath. In an alternative arrangement, the connections could be offset on the same side of the crankshaft so that the motion is made reciprocated but with no titling. In another variation, the crankshaft mechanism is a single crank connection with the hopper which would be preferably located in a median position along the crankshaft stick 90.

The actuating means is mechanically driven in a manner similar to the previous embodiment of FIGS. 1 to 4; i.e., in accordance with the rotary motion of the auger drive mechanism or dosing device 30. The crankshaft mechanism 9 and the driving means are connected via transmission means 8.

For that, one end 97 of the crankshaft is fixedly connected to the center of an upper drive wheel 81 having a determined diameter. The upper drive wheel and the lower drive adapter 33 of the auger drive mechanism are coupled by means of a flexible transmission means 8 such as a long belt 80 extending along substantially the all height of the device. As is apparent from the concept of the crankshaft mechanism, the hopper is subjected to a continuous back-and-forth vertically oriented motion with no discrete shocks as opposed to the previous embodiment. Therefore, a full motion cycle will be considered in the context of the invention as corresponding to a full revolution of the crankshaft member. Consequently, the optimum frequency range is between one revolution every 20 to 1000 seconds, and preferably one revolution every 300 to 600 seconds.

A reclosable transverse opening 200 may be provided, when necessary, on the vicinity of the upper part of the hopper which allows refilling the hopper in powder. The opening may be made reclosable by means of a zipper or similar reclosable system.

Figure 6:
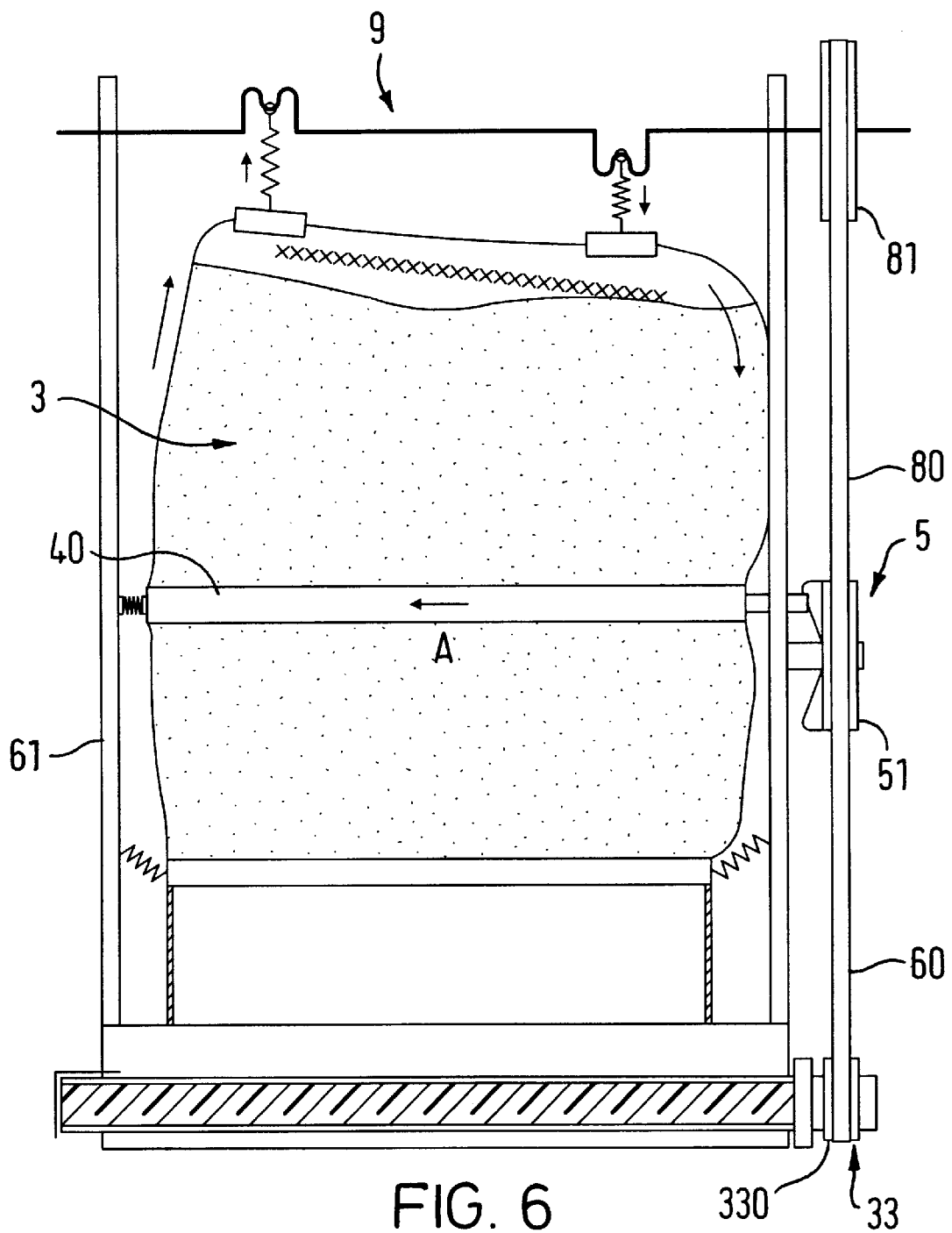
FIG. 6 is a cross-sectional view of a second variant of the invention which combines the embodiment of FIGS. 1 and 5.

In the embodiment of FIG. 6, it is shown an apparatus which combines the actuating means of the first embodiment with a transverse pushing effect and the actuating means of the second embodiment with the upwardly oriented pulling effect. For that, the pushing means 5 and the pulling means 9 may be coupled together via a common transmission belt 80 which passes along the pushing wheel 51 and make the connection between the upper wheel 81 and the lower wheel 330. In an alternative embodiment (not shown), the pushing wheel 51 and the upper wheel 81 are driven via separate transmission belts which are connected respectively to two separate lower wheels of the dosing device.

The hopper when fully filled with powder may weigh from 500 grams for small dispensing machines to up to three kilograms for the larger dispensing machines. In standard beverage dispensing machines, at least three hoppers are installed, for a total weight of about 2 and ½ Kg; two hoppers for instant coffee (regular and decaffeinated coffee) and one for creamer powder. Of course, other dispensing arrangements are possible and the invention is not limited to a specific dispensing arrangement nor to a limited number of hoppers in the machine. The space between the hopper and the outer walls of the machine would not generally exceed 2.5 to 3 cm. Therefore, the present proposed system has also the advantage to fit into the restricted space of the dispensing machine. The compact configuration of the invention is also to be considered as an advantage over existing vibrating devices.

Figure 14:
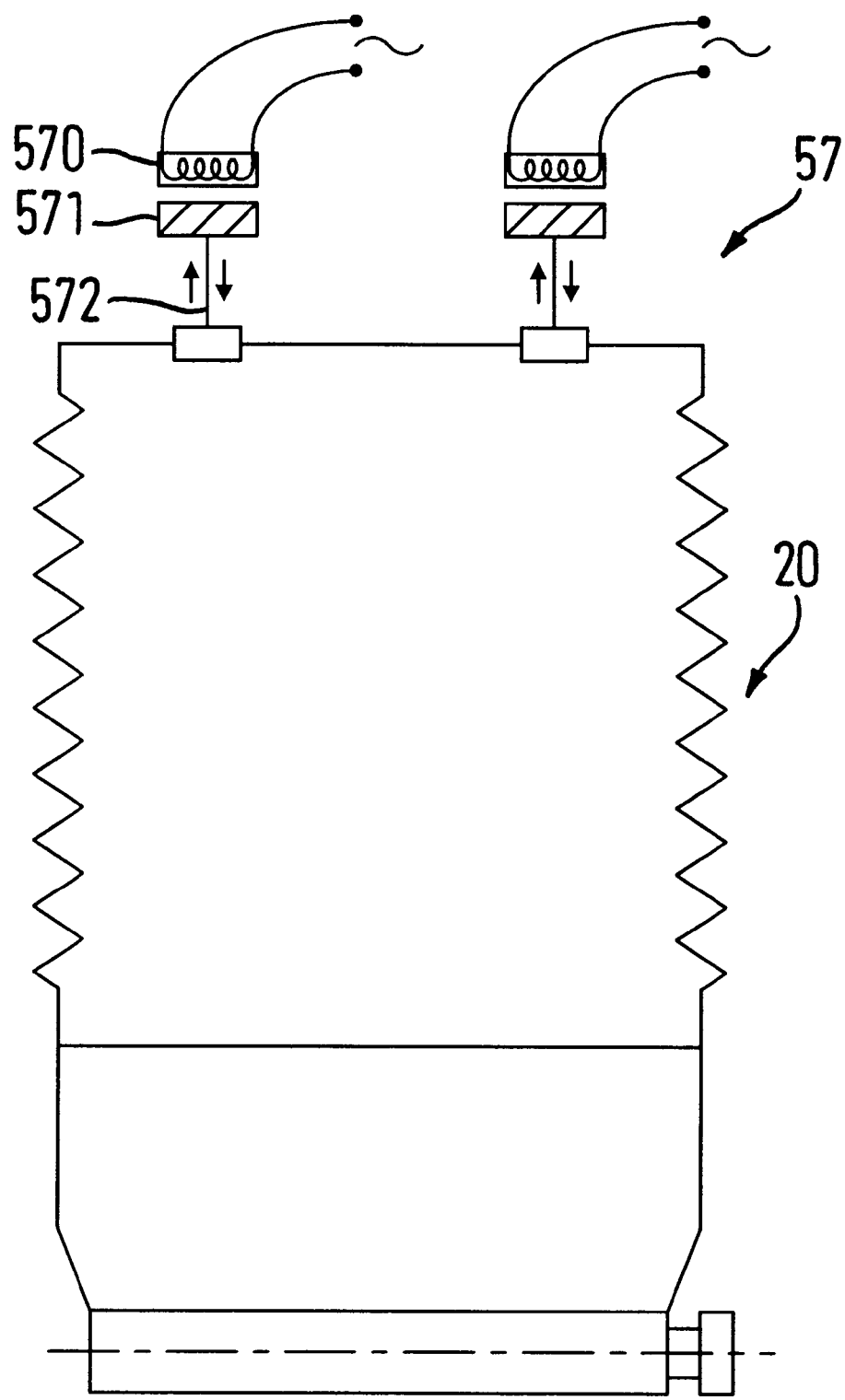
FIG. 14 is a schematic view of another variant of the invention based on magnetically driven actuating means.

While the foregoing has been described in connection with mechanical actuating means, one may also replace or complete those means by other suitable equivalents. In particular, the hopper could also be magnetically excited at the low frequency required by using magnetically driven actuating means. As an example, FIG. 14 illustrates an apparatus with magnetic actuating means 57 in replacement of the crankshaft mechanism of FIGS. 5 and 6. Each magnetic actuating means comprises a solenoid coil wound member 570 connected to an electric power supply and a ferro-magnetic member 571 attached by a link 572 to the hopper. The solenoid member is in stationary position while the ferro-magnetic member 571 is vertically movable upon energization of the solenoid member. When a magnetic field is created, the ferro-magnetic member is attracted and abuts with the solenoid member 570 thus causing the hopper to stretch out in vertical direction. A timing control system (not shown) is coupled to the two actuating means 57 for driving the actuating members at the desired frequency either in an alternative or simultaneous motion.

As is clear from the foregoing, various modifications of the present invention may be made without departure form the spirit and scope of the disclosure and description, and the invention may be embodied and/or practiced suitably in the absence of and/or to the exclusion of physical structure and/or process steps and/or manipulations, conditions, substances employed, present and/or manipulated, and/or limitations not specifically disclosed therein.

What is claimed is:

1. An apparatus for delivering food powder in a beverage dispenser comprising:
    a hopper for containing a beverage powder and including at least one flexible body member;
    an actuator coupled with the flexible body member of the hopper for imparting motion thereto;
    a drive coupled to the actuator, the drive being activated in an active mode to actuate the actuator to impart motion to a portion of the flexible body member at a frequency that is sufficiently low to correspond to a non-vibrating mode; and
    a dosing assembly disposed under and adjacent the hopper body for receiving the powder and outputting doses of the powder;
    wherein the actuator is configured for reciprocal actuation to impart a shock motion in a direction substantially transverse to the body member, while substantially; maintaining the transverse cross-section of the body member.

2. Apparatus according to claim 1, wherein the flexible body member is made of a resilient plastic and has an accordion or pleated design and the actuator includes a substantially rigid member that extends along at least a portion of a transverse perimeter of the flexible body member.

3. Apparatus according to claim 2, wherein the actuator comprises a movable band or ring that imparts motion to the flexible body member at a frequency of less than one shock motion cycle per 20 seconds.

4. Apparatus according to claim 2, wherein the actuator is a movable band or ring that is driven by the drive, at a frequency of one shock motion cycle per 100 to 1000 seconds.

5. Apparatus according to claim 2, wherein the actuator is a movable band or ring that imparts actuating motion cycles having a profile in the form of a series of discontinuous shocks separated by rest periods.

6. Apparatus according to claim 2, wherein the actuator is a movable band or ring that imparts a continuous profile of a,series of individual adjacent shock motion cycles.

7. Apparatus according to claim 1, wherein the actuator is a movable band or ring that imparts a shock motion cycle in a direction transverse to the flexible body member and the outer perimeter of the flexible body member.

8. Apparatus according to claim 1 wherein the drive is mechanical drive.

9. Apparatus according to claim 1, wherein the drive is a magnetic drive.

10. Apparatus according to claim 1, wherein the actuator, comprises a movable band or ring that at least partially surrounds the flexible body member, and a pushing mechanism which imparts to the ring a reciprocating motion in a direction substantially transverse to the hopper.

11. Apparatus according to claim 1, wherein the actuator comprises a rotary crankshaft member transversally-arranged above the hopper and which includes at least one crank connection arranged substantially offset with respect to the rotation axis of the crankshaft member so as to impart a reciprocating motion to the hopper.

12. An apparatus for delivering food powder in a beverage dispenser, comprising
    a hopper for containing a beverage powder and including at least one flexible body member;
    an actuator coupled with the flexible body member of the hopper for imparting motion thereto, wherein the actuator comprises a movable band or ring that imparts a shock motion cycle in a direction transverse to the flexible body member and the outer perimeter of the flexible body member, the actuator being located at a distance from the hopper base which, at a minimum is substantial equal to at least half the length of the hopper and, at a maximum, is substantially equivalent to ⅔ of the length of the hopper; and
    a drive coupled to the actuator, the drive being activated in an active mode to actuate the actuator to impart motion to a portion of the flexible body member at a frequency that is sufficiently low to correspond to a non-vibrating mode.

13. An apparatus for delivering powder in a beverage dispenser comprising:
    a hopper for containing a beverage powder and including at least one flexible body member;
    an actuator coupled with the flexible body member of the hopper for imparting motion thereto, the actuator comprising a movable band or ring that at least partially surrounds the flexible body member, and the actuator comprising a pushing mechanism that imparts to the ring a reciprocating motion in a direction substantially transverse to the hopper; and
    a drive coupled to the activated in an active mode to actuate the actuator to impart motion to the flexible body member at a frequency that is sufficiently low to correspond to a non-vibrating mode;
    wherein the pushing mechanism further includes a rigid member protruding outwardly from the band or ring and onto which acts a cam means which comprises a contact surface with at least one raised area adapted to repetitively push the rigid member in the substantially transverse direction.

14. Apparatus according to claim 13, further comprising an elastic tensioner connected to the band or ring in a position effective to substantially maintain the rigid member in contact with the cam means and to pull the band or ring back to it position of origin for another motion cycle.

15. An apparatus for delivering powder in a beverage dispenser comprising:
- a hopper for containing a beverage powder and including at east one flexible body member;
- an actuator coupled with the flexible body member of the hopper for imparting motion thereto; and
- a drive coupled to the actuator and being activated in an active mode to actuate the actuator to impart motion to the flexible body member at a frequency that is sufficiently low to correspond to a non-vibrating mode;
- wherein the actuator is linked to a dosing mechanism by a transmission so that when the dosing mechanism is driven during dosage, the transmission is driven to activate the actuator.

16. Apparatus according to claim 15, wherein the transmission comprises a flexible transmission with a belt connecting the actuator to a rotary wheel drive adapter positioned at one end of the dosing drive mechanism.

17. Apparatus according to claim 16, wherein the dosing drive mechanism includes an auger connected to the drive adapter.

18. An apparatus for delivering powder in a beverage dispenser comprising:
- a hopper for containing beverage powder and comprising at least one flexible body member;
- an rotary auger mechanism for dosing the powder;
- a driver configured for rotatably driving the rotary auger mechanism according to a predetermined revolution rate;
- a mechanical actuator coupled with the flexible body member of the hopper to impart an actuating motion cycle to the flexible body member according to at least one pushing or pulling direction when the actuator is driven rotatably in rotation according to a second revolution rate; and
- a gear assembly engaging both the actuator and the auger mechanism, wherein the gear assembly is arranged to transmit a gear reduction from said first revolution rate of the auger mechanism to said second revolution rate of the actuator so that the actuator imparts motion at a frequency corresponding to a non-vibrating mode.

19. An apparatus for delivering a powder, comprising:
- a hopper comprising a flexible body member configured for containing a beverage powder ad defining an outlet configured for outputting the powder, the flexible body having first and second perimeter portions that are displaced from each other along a hopper axis that extends through the center of the flexible body and outlet;
- an actuator associated with the first perimeter portion of the flexible body member for imparting movement to the flexible body;
- a drive drivingly associated with the actuator, wherein the actuator and the drive are configured and associated with the flexible body for reciprocally displacing the first perimeter portion in translation substantially transverse to the hopper axis with respect to the second perimeter portion for deforming the hopper axis; and
- a dosing assembly disposed under the output for receiving the powder and delivering doses of the powder, wherein the driver is in driving association with the dosing assembly for operating the actuator when the dosing assembly is operated.

20. The apparatus of claim 19, wherein the actuator is configured for substantially preventing compacting of the flexible body along the displacement of the first perimeter portion.

21. The apparatus of claim 19, wherein the apparatus is a beverage dispenser.

22. The apparatus of claim 19, wherein the actuator is connected to the flexible body on a first side for pulling the first side to cause said translation.

23. The apparatus of claim 22, wherein the actuator is connected to the flexible body on a second side substantially opposite from the first side, wherein the driver and actuator are configured for moving the first and second sides concurrently in a same direction.

24. The apparatus of claim 19, wherein the driver and actuator are configured for causing said translation in a shock motion comprising short periods or rapid movement separated by periods of relatively little or no movement.

25. The apparatus of claim 19, wherein the driver is configured for causing said translation at a frequency that is sufficiently low to correspond to a non-vibrating mode.

26. An apparatus for delivering a powder, comprising:
- a hopper comprising a flexible body member configured for containing a beverage powder and outlet configured for outputting the powder;
- an actuator associated with the flexible body member for imparting movement to the flexible body;
- a drive drivingly associated with the actuator, wherein the actuator and the drive are configured and associated with the flexible body or reciprocally and substantially non-compressively deforming the hopper body sufficiently for breaking macro structures of the powder therein to facilitate flow of the powder within the hopper; and
- a dosing assembly disposed under and adjacent the hopper body for receiving the powder and outputting doses of the powder.

* * * * *

UNITED STATES PATENT AND TRADEMARK OFFICE
CERTIFICATE OF CORRECTION

PATENT NO. : 6,382,470 B1
DATED : May 7, 2002
INVENTOR(S) : Hu et al.

It is certified that error appears in the above-identified patent and that said Letters Patent is hereby corrected as shown below:

Column 12,
Line 3, change "a,series" to -- a series --;
Line 18, change "transversally-" to -- transversally --;
Line 34, change "substantial" to -- substantially --;
Line 53, after "a drive coupled to the", insert -- actuator and being --; and
Line 67, change "it" to -- its --.

Column 13,
Line 4, change "at east" to -- at least --; and
Line 46, change "ad" to -- and --.

Column 14,
Line 37, after "for containing a beverage powder and", insert -- defining an --.

Signed and Sealed this

Twenty-second Day of October, 2002

Attest:

Attesting Officer

JAMES E. ROGAN
Director of the United States Patent and Trademark Office